(12) United States Patent
McCulloch et al.

(10) Patent No.: US 6,690,515 B2
(45) Date of Patent: Feb. 10, 2004

(54) LASER SYSTEM WITH MIXED POLARITY BEAMLETS

(75) Inventors: David J. McCulloch, Redhill (GB); John A. Clarke, Carshalton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 19 days.

(21) Appl. No.: 09/924,988

(22) Filed: Aug. 8, 2001

(65) Prior Publication Data

US 2002/0021497 A1 Feb. 21, 2002

(51) Int. Cl.$^7$ ................................................ G02B 27/10
(52) U.S. Cl. ........................................ 359/624; 359/621
(58) Field of Search .................................. 359/621, 622, 359/623, 196, 624

(56) References Cited

U.S. PATENT DOCUMENTS

| | | | | |
|---|---|---|---|---|
| 4,733,944 A | * | 3/1988 | Fahlen et al. | 359/624 |
| 5,418,583 A | * | 5/1995 | Masumoto | 353/38 |
| 6,157,492 A | * | 12/2000 | Yamazaki et al. | 359/623 |

* cited by examiner

Primary Examiner—Georgia Epps
Assistant Examiner—Alicia M Harrington

(57) ABSTRACT

In a laser system for laser crystallization of semiconductor films, a laser source produces a laser beam that is transmitted to a lens system having a plurality of lens elements adapted to divide the beam into a plurality of beamlets. At least one of the beamlets is inverted relative to the others, such that a desired intensity profile is generated at the output of the laser system.

16 Claims, 3 Drawing Sheets

LASER SYSTEM WITH MIXED POLARITY BEAMLETS

FIELD OF TECHNOLOGY

This invention relates to laser systems, particularly but not exclusively for providing output profiles suitable for laser crystallisation of semiconductor films, such as crystallisation of amorphous silicon to form polycrystalline silicon in thin film devices. The invention also relates to apparatus and methods for crystallising a semiconductor film using such a laser system.

BACKGROUND AND SUMMARY

It is well known that the use of laser crystallisation processes can enable the manufacture of low-temperature poly-silicon devices, for example for displays or other circuits. However, the laser crystallisation process can give rise to poor yields, resulting from poor uniformity of the laser crystallisation process.

One factor contributing to this poor uniformity is the use of a simple so-called top-hat beam profile. This form of output is typical of known laser beam homogenisers. The top-hat profile has a substantially constant intensity over the width of the profile. Thus, when an amorphous silicon film is crystallised by scanning this beam across it, the amorphous silicon film is exposed to a substantially constant intensity. This intensity must fall within a very narrow range for the crystallisation process to be successful. This is because it is required that nearly all of the film is melted during the crystallisation process, but there should be no full melt-through of the amorphous silicon layer. During cooling, a portion of the layer which has experienced full melt-through will recrystallise into a fine-grained structure giving rise to reduced quality in the final product. The intensity may exceed the maximum value and thereby achieve full melt-through as a result of jitter in the output from the laser source.

Because the laser output is scanned across the sample being treated, an individual laser pulse which exceeds the maximum desired intensity will be the first laser shot applied to some areas of the substrate, but will be the last laser shot applied to other areas. The region of the substrate for which that pulse was the last shot will recrystallise into this fine-grained structure since no further laser heating is carried out.

The present invention provides a laser system comprising a laser source for producing a laser beam having a first intensity profile in one transverse direction, and a lens system for modifying the first intensity profile, the lens system comprising a plurality of lens elements adapted to divide the beam into a plurality of beamlets across the first intensity profile, at least one of the beamlets outputted by the lens system being inverted relative to the others, such that a desired intensity profile is generated at the output of the laser system. This lens system enables the beam generated by the laser source to be modified so that the output of the laser system is altered as required for laser crystallisation, addressing the problem identified above. This is achieved substantially without loss of beam energy or increase in fluence jitter.

In a preferred embodiment, the lens elements are arranged in two spaced arrays, each extending along the one direction, the arrays being adapted to invert the at least one beamlet relative to the others. Alternatively, the lens system may comprise two spaced arrays of primary lens elements, each extending along the one direction, with pairs of lens elements, one from each array, being arranged to invert a respective beamlet, wherein one or more additional lens elements are included to prevent inversion of the at least one beamlet or to provide a further inversion of the at least one beamlet. Thus, for example, additional lens elements may be inserted in an existing lens system to adapt it in accordance with the invention. Prevention of inversion rather than further inversion is preferred, as the latter may lead to greater light losses and divergence of the beamlets leaving the lens system.

The additional lens elements may comprise one or more pairs of secondary lens elements arranged between respective pairs of primary lens elements. Preferably, each of the secondary lens elements has a concave surface.

The at least one of the beamlets are preferably those located to one side of the centre of the first intensity profile. More particularly, where there is an even number of beamlets of substantially equal width, the at least one of the beamlets may be those in one half of the intensity profile. If there is an odd number of beamlets of substantially equal width, the at least one beamlets are those to one side of the central beamlet. The number of beamlets inverted may also be varied to suit particular requirements, thereby altering the overall impact of the inversions.

Preferably, the intensity profile outputted by the laser system is tapered over at least part of the width of the profile. This may be advantageous for reasons discussed below.

The laser source may comprise a pulsed source, generating a beam having a semi-Gaussian profile.

An optical filter may be provided also to modify the intensity profile generated at the output of the laser system. Such a filter is the subject of a co-pending U.S. patent application Ser. No. 09/643,486 filed Aug. 22, 2000, the contents of which are hereby incorporated herein by reference. The filter may comprise transmissive portions and opaque portions, the transmissive portions defining a repeating pattern with a pitch corresponding to the lens pitch of the primary lens elements.

The present invention also provides laser apparatus comprising a laser system of the invention, and means for scanning the width of the desired intensity profile relative to the surface of a sample to be laser treated. The scanning may be achieved by mounting the sample on a movable support.

BRIEF DESCRIPTION OF THE DRAWINGS

A prior art configuration and embodiments of the invention will now be described, by way of example, with reference to and as shown in the accompanying drawings in which.

DETAILED DESCRIPTION

Figure 1:
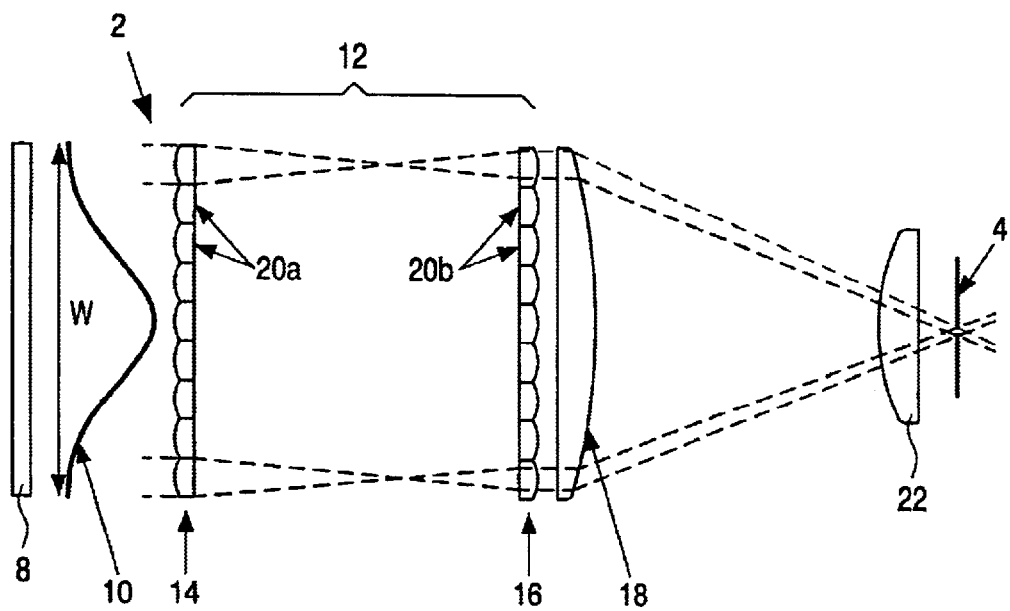
FIG. 1 shows selected elements of a known laser system comprising a homogeniser for producing a top-hat intensity profile.

FIG. 1 shows selected elements of a known laser system 2 comprising a homogeniser 12. The homogeniser 12 is adapted to produce a laser output suitable for crystallisation of a semiconductor sample. The system 2 is for radiation of a sample (not shown) with a line beam 6 having a controlled intensity profile. Typically, the sample comprises a silicon film on an insulating substrate. The line beam 6 is scanned across the surface of the sample, and this is normally achieved by mounting the sample on a movable support (not shown).

The laser system comprises a laser source 8 which may generate a beam having a semi-Gaussian intensity profile. The output of the laser source is a light front or beam. In one dimension, transverse with respect to the direction of propagation of the beam, the intensity varies following a normal distribution, as represented by curve 10, whereas the intensity is constant following the transverse dimension orthogonal thereto. The width of the beam W may be approximately 20 mm, and the depth (into or out of the page in relation to FIG. 1) may have a similar dimension.

For laser crystallisation a line beam is desired having a narrow width, for example 0.5 mm, but a much greater length to span across the entire substrate of the semiconductor film. Also, it is desirable to modify the normal intensity profile shown as curve 10.

In order to reshape and modify the intensity of the light signal, a homogeniser 12 is provided which comprises an input array 14 of lens elements 20a, an output array 16 of lens elements 20b, and a focusing or condenser lens 18. The individual lens elements 20a, 20b of each array are positive power lenses and may be, for example, plano-convex cylindrical lenses. The effect of the homogeniser 12 is to divide the intensity profile 10 into different sections or beamlets, and then to overlap the beamlets so as to produce a more uniform laser intensity across the width of the profile. The beamlets to each side of the central beamlet have a ramped profile, corresponding to the respective portion of the semi-Gaussian beam. The beamlets are focussed together by the condenser lens 18 towards a slit 4, which sharpens the edge of the final beam. The width of the aperture may be adjustable to provide different beam widths. A field lens 22 may also be provided.

The function of the lenses 14, 16 and 18 is to alter and homogenise the intensity profile of the laser beam across its width. A further array of lenses is also provided, although not shown in FIG. 1, for altering the shape of the laser output orthogonally relative to the profile 10. This further array of lenses comprises a perpendicular lens array, which may be arranged to alter the intensity profile in the long axis of the laser output, in order to reshape the area of coverage of the laser output to provide the line beam required.

To the extent described above, the operation of the laser system 2 described with reference to FIG. 1 is known. In particular, existing commercially available systems have specific optical designs to enable the conversion of a semi-Gaussian intensity profile output from a laser source 8 to a so-called top-hat intensity profile. These intensity profiles will now be described with reference to FIGS. 2 and 3.

Figure 2A:
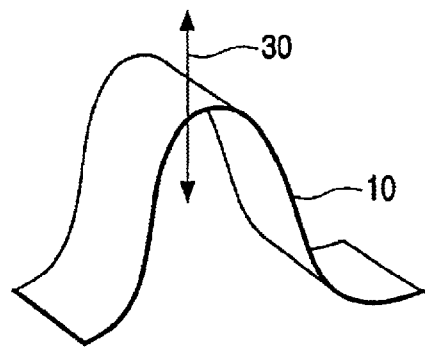
FIGS. 2A and 2B show perspective views of a semi-Gaussian intensity profile of a laser beam and a top-hat profile, respectively.
Figure 2B:
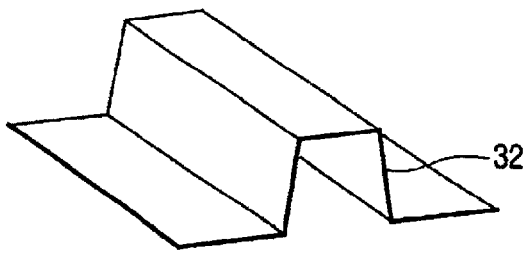

FIG. 2A represents schematically a perspective view of a semi-Gaussian output profile 10 of the laser source 8. This intensity profile is not totally constant over time, and so-called jitter in the fluence occurs even in state-of-the-art lasers. The most significant type of jitter for the following discussions is so-called fluence jitter represented by arrow 30. The result of fluence jitter is that the peak intensity of the laser is not constant and can rise or fall within certain tolerances unpredictably. FIG. 2B shows in perspective the desired top-hat intensity profile 32 conventionally used in laser crystallisation apparatus. As represented schematically, the profile has a substantially constant intensity over the main width of the profile, and the length of the beam is greatly increased with respect to the output of the laser source 8.

Figure 3:
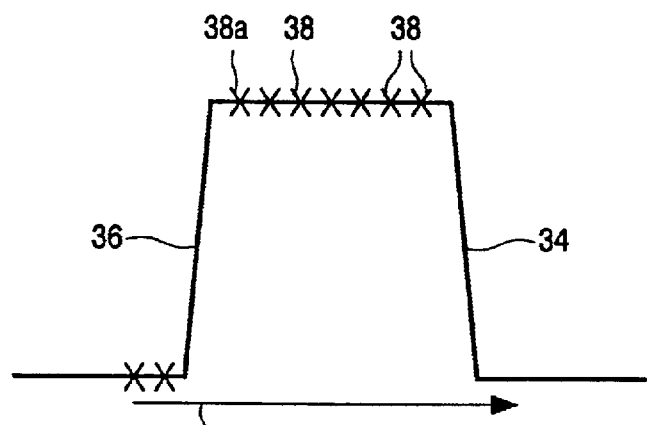
FIG. 3 shows a top-hat profile at the output of the system of FIG. 1.

FIG. 3 shows in greater detail the top-hat intensity profile. Line 32 represents the scan direction of the beam across the surface of the sample. Thus, the edge 34 represents a leading edge of the intensity profile, and the edge 36 represents a trailing edge. During laser crystallisation, the laser source 8 is pulsed during the relative movement between the laser output and the sample 4. Consequently, a given point on the sample is subjected to a number of shots of laser irradiation, represented by crosses 38 in FIG. 3. With the number of shots illustrated for example in FIG. 3, each area of the sample is subjected to seven laser shots at a substantially constant intensity along the top of the top-hat profile. The overall width of the top-hat profile may be around 500 $\mu$m, and although the leading and trailing edges are intended to be vertical, they may typically occupy a width of around 50 $\mu$m.

A problem with the use of the top-hat profile that has been recognised in the past is that the profile does not tolerate much fluence jitter 30 as represented in FIG. 2A. This is because the intensity at the constant part of the top-hat profile is highly critical. In the case of laser crystallisation of amorphous silicon to form polycrystalline silicon, the energy provided by the laser crystallisation process is required to melt the amorphous silicon film across almost its full depth (thickness). However, a full melt of the amorphous silicon layer is to be avoided, as the subsequent cooling gives rise to a fine crystalline structure. The laser crystallisation is intended to provide the largest possible grain size, and this is achieved by approaching as closely as possible a full melt, but without actually achieving that full melt. Thus, to achieve the largest grain size the intensity of the top-hat profile must be selected as close as possible to the maximum level. Any fluence jitter in the output of the laser source 8 will translate to a fluctuation in the profile of FIG. 3. An increase in intensity in the top-hat profile will be particularly severe for those areas of the sample receiving their final laser shot from that particular pulse of the laser source 8. This is shot 38a in FIG. 3. For these areas of the sample, recrystallisation will form a fine-grained structure, and there will be no further laser shots to remedy this situation.

Figure 4:
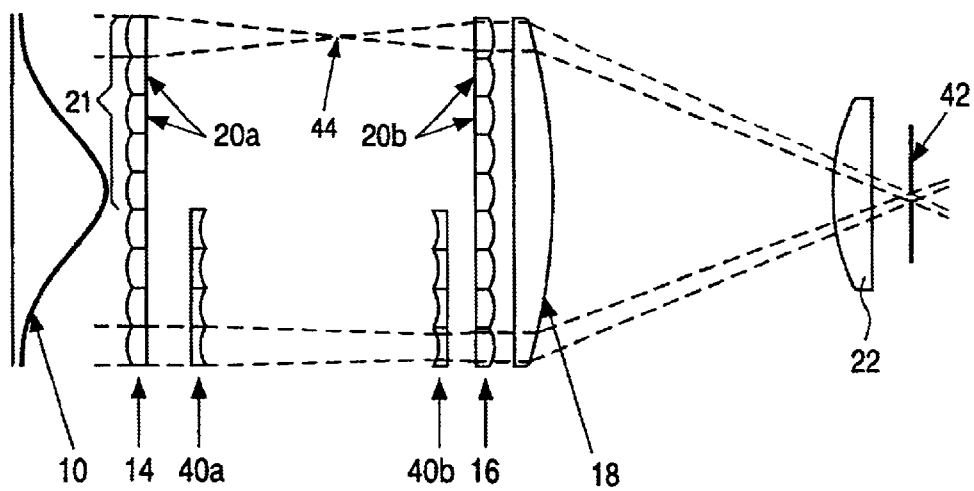
FIG. 4 shows the laser system of FIG. 1 when modified in accordance with the invention.

FIG. 4 shows a laser system of FIG. 1, modified in accordance with the invention to address the above problem. The modification involves the insertion of two additional arrays of negative power lens elements, 40a and 40b, which may be, for example, of a piano-concave cylindrical form. Each pair of additional lens elements is aligned with a respective pair of those lens elements in the arrays 14 and 16 which are to one side of the central lens element in each array 14 and 16. The remaining pairs of lens elements in the arrays 14 and 16 (that is, the upper five pairs shown in FIG. 4) cooperate in the same manner as those of the laser system 2 of FIG. 1. That is, the group of lens elements 21 in the input lens array 14 divide the incident intensity profile into beamlets which are brought to a focus in the focal plane of the lens elements 20b. This focus is identified by numeral 44 for the uppermost lens element in FIG. 4. The beamlets then diverge until incident on the output array 16, which refracts the beamlets to propagate as substantially parallel beams again. The beamlets emerging from these elements of the output array are inverted relative to their orientation when leaving the group 21 of the input array. The additional arrays 40a and 40b prevent inversion of the respective beamlets. Array 40a changes the incident converging beam to a less converging beam or even to a substantially parallel one, whilst array 40b changes this beam to have a divergence approximately the same as that incident on lens elements 20b in FIG. 1.

Figure 5:
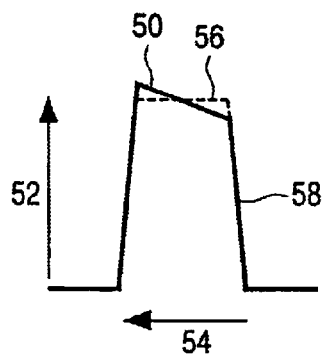
FIG. 5 shows an intensity profile generated by the laser system of FIG. 4.

In this way, the ramped profiles of the individual beamlets are inverted to one side only of the beam centre. The beamlets (other than the central beamlet) are therefore all ramped in the same direction, reinforcing each other, rather than cancelling out, as in the known top hat arrangement. This results in an improved laser intensity profile 50 as shown in FIG. 5, in which fluence increases in the direction of arrow 52. The profile has a downward gradient. FIG. 5 shows an intensity profile generated at the output of the laser system of FIG. 4, as viewed looking from left to right. A top hat profile is shown by way of comparison by dotted line 56. This profile can thus be scanned across a substrate in the direction of arrow 54, such that the fluence decreases towards the trailing edge 58.

The modified profile may vary the fluence relative to the top hat profile by ±10%, for example. The degree of variation is dependent on the size of the lens elements relative to the width of the original semi-Gaussian beam. Using fewer elements will produce a greater variation and vice versa. A variation of ±10% may be achieved using an original beam six times the width of a single lens element.

This tapered profile ensures all areas of the sample are subjected to the desired number of shots, so there is sufficient energy for large grain growth throughout the sample area, and that the final shots applied to each area of the sample do not have sufficient energy for full melt through, even if there is fluence jitter in the output of the laser source 8. It should also be configured such that the final shots have sufficient energy to recover an area that may have been fully melted through owing to jitter on a preceding pulse, from full melt through to the desired nearly melted through state.

Figure 6:
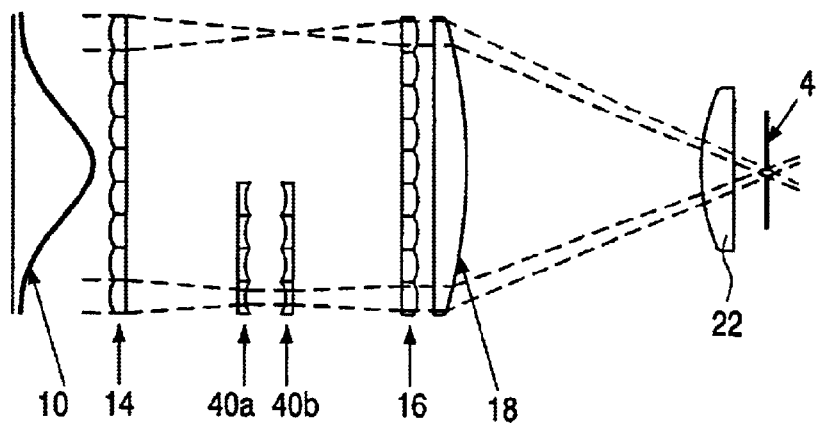
FIGS. 6 to 8 show further embodiments of a laser system according to the invention.

The configuration shown in FIG. 6 is similar to that of FIG. 4, except that the additional arrays 40a and 40b are located more closely together, closer to each other than to the input and output arrays 14 and 16. This has been found to be advantageous in minimising light loss in these elements.

Figure 7:
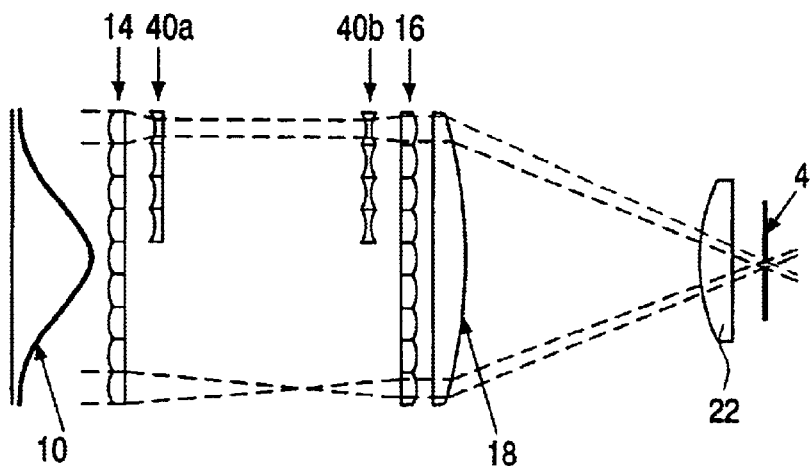

A further embodiment is shown in FIG. 7, wherein biconcave lenses are used to form the additional array 40b, in place of the plano-concave lenses shown in FIGS. 5 and 6. It will be appreciated that other such combinations of lens types and configurations may be adopted to produce a desired intensity profile.

Figure 8:
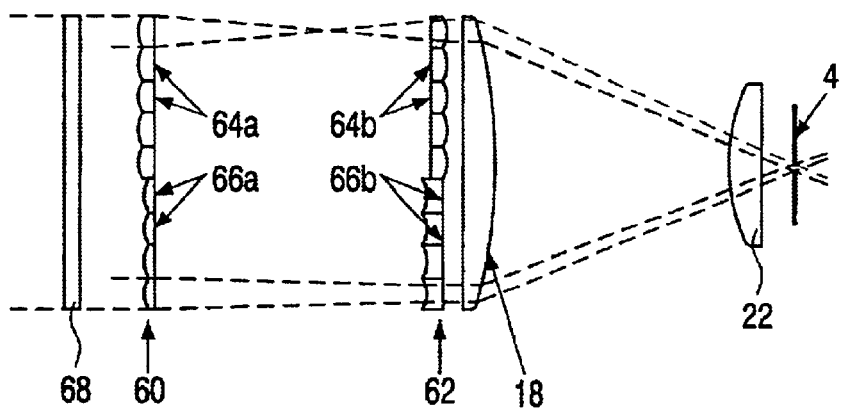

Rather than modifying an arrangement of input and output arrays of lens elements with additional elements to carry out the invention as described above in relation to FIGS. 4, 6 and 7, an alternative embodiment of the invention is illustrated in FIG. 8, in which the input and output arrays 60,62 are themselves changed. In the laser system shown in FIG. 8, the input and output arrays comprise lens elements of different types. The upper five pairs of lens elements 64a and 64b are positive power cylindrical elements, possibly with a plano-convex shape, similar to those of arrays 14 and 16 shown in the earlier Figures. The lower four lens elements 66a of input array 60 are also positive power cylindrical lenses, but of reduced power relative to lenses 64a and hence extended focal length relative to the lens elements 64a. The lower four lens elements 66b of output array 62 are negative power lenses and may be of piano-concave cylindrical shape. It can be seen that the lower four pairs of lens elements correspond to combinations of the additional lens elements of previous Figures with their counterparts in the adjacent input and output arrays.

A further preferred embodiment is similar to that of FIG. 8. In this arrangement, lens elements 66a are omitted from the first array. Lens elements 66b are replaced in the second array by elements having a relatively slight negative power. This arrangement may be advantageous in terms of minimising the effects of off-axis light due for example to divergence in the original laser beam.

It is evident that omission of the lens elements 66a and 66b altogether would result in a beamlet being inverted relative to the others. However, this may lead to light being lost due to the small divergence in the laser beam and this may also compromise the homogeneity of the output of the laser system.

Another preferable modification to the known laser system of FIG. 1 is shown in FIG. 8 by way of example. An optical filter 68 is inserted in the beam path, between the laser source and the input lens array 60. The filter may be configured to alter the input to the lens system to modify further intensity profile at the output of the laser system. The optical filter may comprise a solid plate or foil patterned with a hole or an array of holes. Alternatively, it may comprise a transmissive substrate such as quartz with suitable anti-reflection layers and patterned dielectric layers for varying the optical transmission.

It will be appreciated that the references herein to an array of lens elements may refer to an array of individual elements or to a unitary lens comprising a plurality of adjacent elements.

From reading the present disclosure, other variations and modifications will be apparent to persons skilled in the art. Such variations and modifications may involve equivalents and other features which are already known in the design, manufacture and use of laser systems and of laser crystallisation apparatus and which may be used instead of or in addition to features already described herein. In particular, advantageous modifications to the configurations described above may be evident to the skilled worker, for example, to address the divergence generally inherent in laser beam sources, and to minimise light losses.

Although claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

The Applicants hereby give notice that new claims may be formulated to any such features and/or combinations of such features during the prosecution of the present Application or any further Application derived therefrom.

What is claimed is:

1. A laser system comprising a laser source for producing a laser beam having a first intensity profile in one transverse direction, and a lens system for modifying the first intensity profile, the lens system comprising a plurality of lens elements adapted to divide the beam into a plurality of beamlets across the first intensity profile, at least one of the beamlets outputted by the lens system being inverted relative to the others, such that a desired intensity profile is generated at the output of the laser system.

2. A laser system of claim 1 wherein the lens elements are arranged in two spaced arrays, each extending along the one direction, the arrays being adapted to invert the at least one beamlet relative to the others.

3. A laser system of claim 1 wherein the lens system comprises two spaced arrays of primary lens elements, each extending along the one direction, with pairs of lens elements, one from each array, being arranged to invert a respective beamlet, and wherein one or more additional lens elements are included to prevent inversion of the at least one beamlet or to provide a further inversion of the at least one beamlet.

4. A laser system of claim 3 wherein the additional lens elements comprise one or more pairs of secondary lens elements arranged between respective pairs of primary lens elements.

5. A laser system of claim 4 wherein each of the secondary lens elements has a concave surface.

6. A laser system of claim 1 wherein the at least one of the beamlets are those located to one side of the centre of the first intensity profile.

7. A laser system of claim 1 wherein the desired intensity profile is tapered over at least part of the width of the profile.

8. A laser system of claim 1 wherein the laser source comprises a pulsed laser source.

9. A laser system of claim 1 wherein the first intensity profile comprises a semi-Gaussian profile.

10. A laser system of claim 1 wherein an optical filter is provided to modify the intensity profile generated at the output of the laser system.

11. A laser system of claim 10 wherein the filter comprises transmissive portions and opaque portions, the transmissive portions defining a repeating pattern with a pitch corresponding to the lens pitch of the primary lens elements.

12. A laser apparatus according to claim 1, including means for scanning the width of the desired intensity profile relative to the surface of a sample to be laser treated.

13. A laser apparatus according to claim 12, wherein the means for scanning comprises a movable support for supporting the sample.

14. A method of crystallizing a semiconductor film during the manufacture of a thin-film device, comprising:
   operating a laser system including a first laser beam having a first intensity profile in one transverse direction;
   generating a resultant laser beam having a desired intensity profile by modifying the first laser beam using a lens system comprising a plurality of lens elements adapted to divide the first laser beam into a plurality of beamlets across the first intensity profile, at least one of the beamlets being inverted relative to others of the beamlets; and
   scanning the resultant laser beam with the desired intensity profile across the semiconductor film to melt the film across a part of its thickness.

15. The method of claim 14, including scanning a width of the desired intensity profile relative to the surface of a sample to be laser treated.

16. The method of claim 15, including supporting the sample with a movable support.

* * * * *